US006438301B1

(12) United States Patent
Johnson et al.

(10) Patent No.: US 6,438,301 B1
(45) Date of Patent: Aug. 20, 2002

(54) LOW-TORQUE ELECTRO-OPTICAL LAMINATED CABLE AND CABLEWRAP

(75) Inventors: Dan R. Johnson, Los Angeles; Mark A. Carroll, Newport Beach; Daniel R. Sherman; Timothy R. Stone, both of Redondo Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/348,370

(22) Filed: Jul. 7, 1999

(51) Int. Cl.[7] .............................. G02B 6/44; H01B 7/08
(52) U.S. Cl. ...................... 385/101; 385/110; 385/114; 174/117 F; 174/117 FF; 174/117 A
(58) Field of Search ................................. 385/100–114; 174/117 F, 117 FF, 117 A, 117 R; 156/51

(56) References Cited

U.S. PATENT DOCUMENTS

| | | | | |
|---|---|---|---|---|
| 4,468,089 A | * | 8/1984 | Brorein | 174/36 |
| 4,679,897 A | * | 7/1987 | Driskel | 174/70 R |
| 5,245,134 A | * | 9/1993 | Vana, Jr. et al. | 385/110 |
| 5,668,912 A | * | 9/1997 | Keller | 385/114 |
| 5,878,180 A | | 3/1999 | Nothofer et al. | |
| 6,006,000 A | * | 12/1999 | Tuttlebee | 385/114 |
| 6,107,577 A | * | 8/2000 | Sexton | 174/117 F |

FOREIGN PATENT DOCUMENTS

| | | | |
|---|---|---|---|
| FR | 2 550 658 | * | 2/1985 |
| FR | 2 735 272 | * | 12/1996 |

* cited by examiner

Primary Examiner—Hemang Sanghavi
(74) Attorney, Agent, or Firm—McAndrews, Held & Malloy, Ltd.

(57) ABSTRACT

An elongated electro-optical cable (100) is presented, which includes a plurality of elongated electrical conductors (104), a plurality of fiber optic elements (102), and an elongated insulating film casing enveloping the plurality of electrical conductors (104) and the plurality of fiber optic elements (102). The fiber optic elements (102), electrical conductors (104), and the elongated insulating film casing are arranged to form a generally flat cable (100). The cable may be arranged such that the electrical conductors (104) are shielded, for example, with a silver epoxy. An outer jacket (402) may be placed around the electrical conductors (104), fiber optic elements (102), and insulating film casing, which jacket (402) may be made from a tetrafluoroethylene polymer fiber. The electrical conductors (104) may be made from oxygen free copper and the insulating film casing may be made from a polyimide polymer. A method for making an elongated electro-optical cable (100) is also presented, which includes insulating a sheet of a plurality of shielded elongated electrical conductors, affixing a sheet of a plurality of fiber optic elements to the laminated insulated electrical conductors, and then insulating the fiber optic elements.

36 Claims, 4 Drawing Sheets

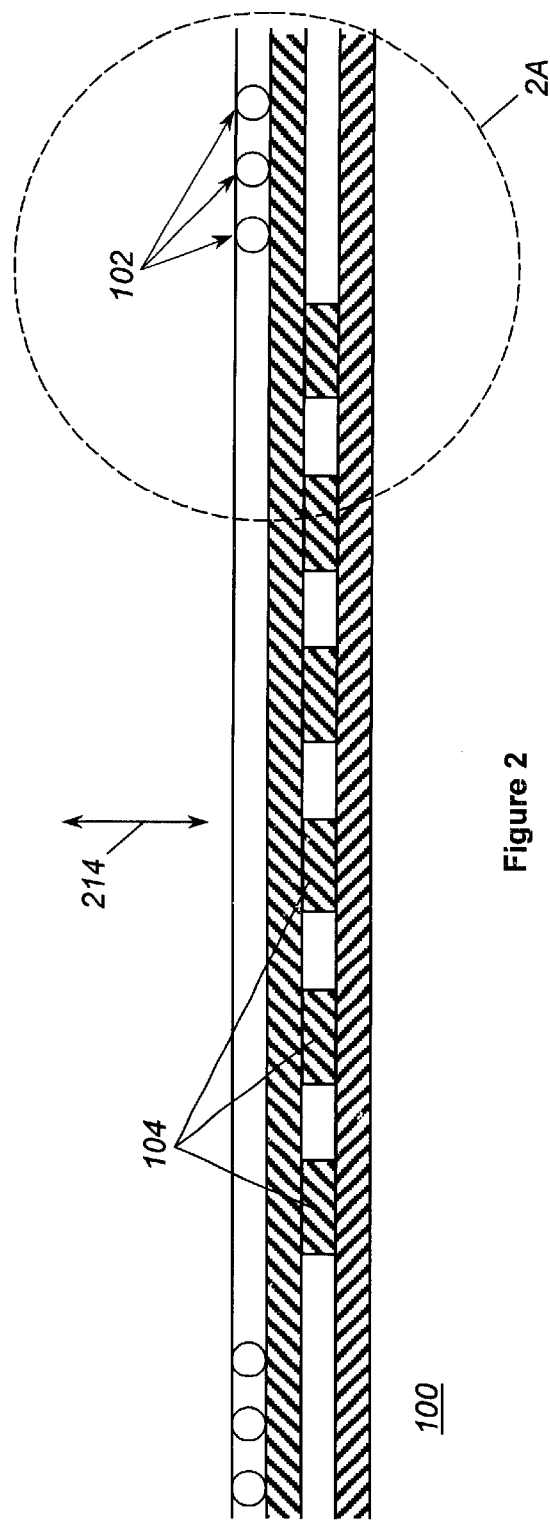
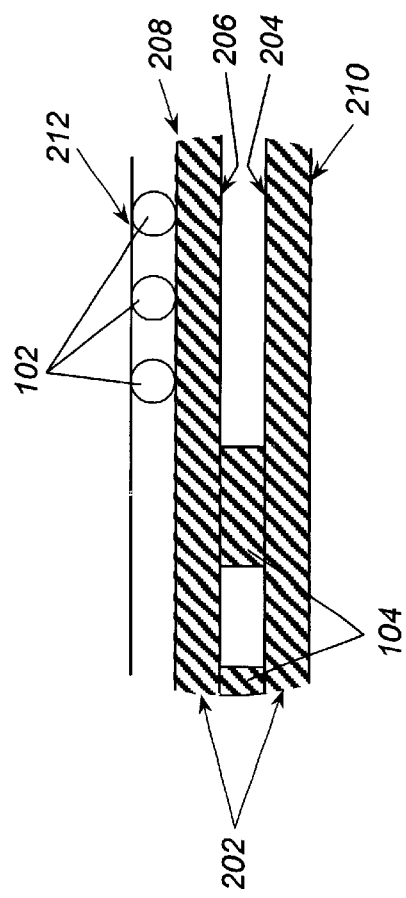

LOW-TORQUE ELECTRO-OPTICAL LAMINATED CABLE AND CABLEWRAP

BACKGROUND OF THE INVENTION

The present invention relates to laminated cables and cablewraps. In particular, the present invention relates to electro-optical laminated cables and cablewraps for routing to mobile electrical and optical devices.

In many systems containing both electrical and optical devices, the electrical and optical devices are mobile. For example, on a satellite electrical and optical devices may be gimbaled (e.g., rotatably mounted) to the satellite so that they can be pointed and rotated. In such a case, it is necessary to provide a cable for communicating between the gimbaled electrical and optical devices and other electrical and optical devices on board the satellite. Such other electrical and optical devices may include electrical and optical devices on a satellite's payload that gather data from terrestrial or non-terrestrial targets.

Past systems have primarily utilized coaxial designs for containing electrical conductors. Past systems have also utilized coaxial designs for separately containing fiber optic elements. Systems used in the past have several drawbacks, however. As a result of the coaxial designs, a large resistive torque is provided against the rotating mechanism. This is, in part, because electrically insulated and shielded conductors are heavy, stiff, and have high friction coefficients. Moreover, many existing fiber optic insulated and shielded elements are heavy, stiff, and have high friction coefficients.

As a result of the high torque placed on rotating mechanisms by cables used in the past, motors would have to use a substantial amount of power just to move the cables connecting the rotating mechanism to the satellite (for example 50% or more of a motor's power). As a result, system efficiency was greatly reduced and larger motors were required to move the rotating mechanism. The large torque created by such cables also resulted in a larger overall weight of the system (and motor), further decreasing system efficiency.

One present system, presented in U.S. Pat. No. 5,878,180 to Nothofer et al., discloses a hybrid cable, containing stacks of optical fiber ribbons contained within a central optical fiber element, and electrical conductor elements twisted around the central optical fiber element. Because the Nothofer system is coaxial in form, however, it contains the shortcomings of the prior art.

A need has long existed in the industry for a low-torque laminated cable and cablewrap. A need has also long existed in the industry for a low-friction laminated cable and cablewrap. A need has further long existed in the industry for a hybrid cable and cablewrap for facilitating communication between both electrical and optical devices and mobile or rotatable electrical and optical devices.

BRIEF SUMMARY OF THE INVENTION

It is an object of the present invention to provide an improved electro-optical cable and cablewrap.

It is a further object of the present invention to provide a low-torque cable and cablewrap for use with electro-optical systems.

It is an additional object of the present invention to provide a cable and cablewrap for transmitting electrical and optical signals across a rotating interface.

It is yet another object of the present invention to provide an improved cable and cablewrap for use in a moving mechanical assembly.

It is a further object of the present invention to provide a low-torque electro-optical cable capable of being oriented in a clock-spring like configuration and creating a relatively low torque when coiled and uncoiled.

It is an additional object of the present invention to provide a cable and cablewrap which permits optical and electrical transmissions between a gimbaled satellite payload and electrical and optical devices on the satellite proper.

It is a still further object of the present invention to provide a cable and cablewrap for connection to Optical Inter-Satellite Link ("OISL") communication devices.

One aspect of the present invention is an elongated electro-optical cable including a plurality of elongated electrical conductors, a plurality of fiber optic elements, and an elongated insulating film casing enveloping the plurality of electrical conductors and the plurality of fiber optic elements. The fiber optic elements, electrical conductors, and the elongated insulating film casing are arranged to form a generally flat laminated cable.

Another aspect of the present invention is a method for making an elongated electro-optical cable including insulating a sheet of a plurality of shielded elongated electrical conductors, affixing a sheet of a plurality of fiber optic elements to the insulated electrical conductors, and insulating the fiber optic elements. The step of affixing a sheet of fiber optic elements may occur before or after the insulating step.

BRIEF DESCRIPTION OF THE DRAWINGS

FIG. 2 presents a cross-section of an electro-optical cable according to a particular embodiment of the present invention.

DETAILED DESCRIPTION OF THE INVENTION

Figure 1:
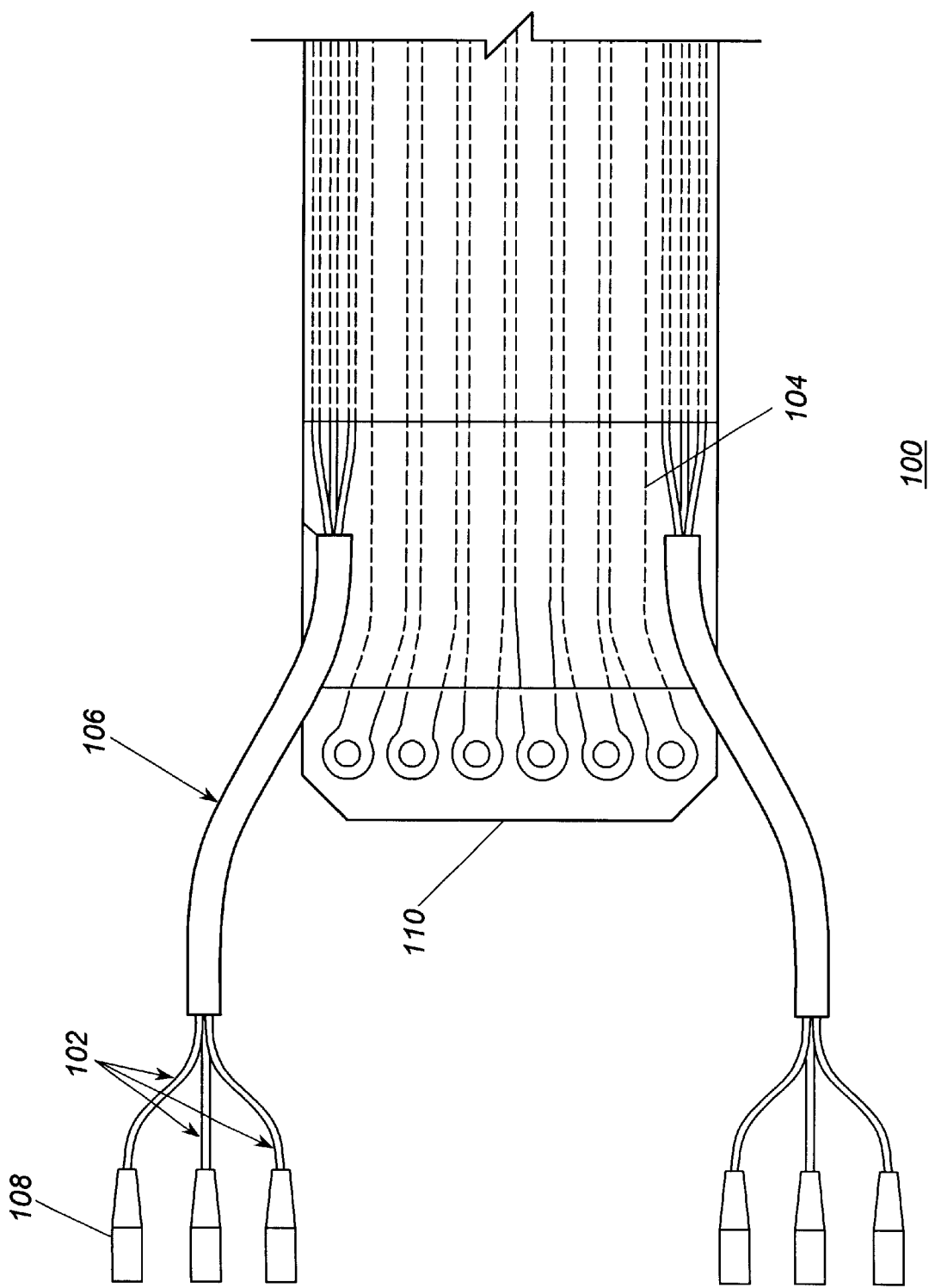
FIG. 1 presents a diagrammatical top view of an eletro-optical cable according to a particular embodiment of the present invention.

FIGS. 1 and 2 present a diagrammatical top view and a cross-section, respectively, of an electro-optical cable 100 according to a preferred embodiment of the invention. FIG. 1 presents an electro-optical cable containing a plurality of fiber optic elements 102 and a plurality of electrical conductors 104. FIG. 1 also presents an armored multi-fiber cable 106 for the fiber optic elements, fiber optic pigtails 108 and a stiffener terminal 110. FIG. 2 presents a cross-sectional view of an electro-optical cable 100. FIG. 2 shows electrical conductors 104, shields surrounding the electrical conductors 202, and fiber optic elements 102. FIG. 2 also shows several insulating film layers 204, 206, 208, 210 and 212.

In a preferred embodiment illustrated in FIGS. 1 and 2, a plurality of laminated electrical conductors 104 are disposed between two shield layers 202 within the electro-optical cable 100. The electrical conductors 104 in the illustrated embodiment are laminated by disposing the conductors between first 204 and second 206 insulating film layers. As a result, the shields 202 presented in the preferred embodiment are disposed outside the first 204 and second 206 insulating film layers (with respect to the electrical conductors 104). The third and fourth insulating film layers 208, 210 are provided along the external sides of the shields 202. A plurality of fiber optic elements 102 is disposed between the third insulating film layer 208 and a fifth insulating film layer 212.

The cable 100 as shown in FIGS. 1 and 2 is preferably constructed so that, when assembled, the cable 100 is generally flat. For example, the cable 100 may be approximately 0.025 inches thick along a cross-sectional direction 214 perpendicular to the longitudinal direction of the cable.

In the preferred embodiment, the cable 100 is ribbonized, i.e., the fiber optic elements 102 and electrical conductors 104 are constrained to lay in a generally flat orientation (as shown in FIG. 2). The cable 100 is preferably used on board a satellite with a gimbaled, rotating and pointing communication device 302. Moreover, the cable 100 is preferably oriented in a clock-spring like fashion when in use to form a cablewrap 300, as shown in FIG. 3.

The preferred, generally flat cable 100 orientation provides a low-torque cablewrap 300: i.e., the cablewrap 300 will not create a great amount of resistance to coiling and uncoiling. The low-torque aspect is especially helpful when the cable is oriented in the clock-spring like fashion such that the cable 100 coils and uncoils as the rotating mechanism 302 is rotated. As a result of the reduced torque, the rotating mechanism 302 can be rotated with less power, for example, with a smaller, lighter-weight motor than motors used with conventional systems. The ability to use a smaller motor also results in lower overall power usage and a lower overall rotating mechanism weight.

Figure 3:
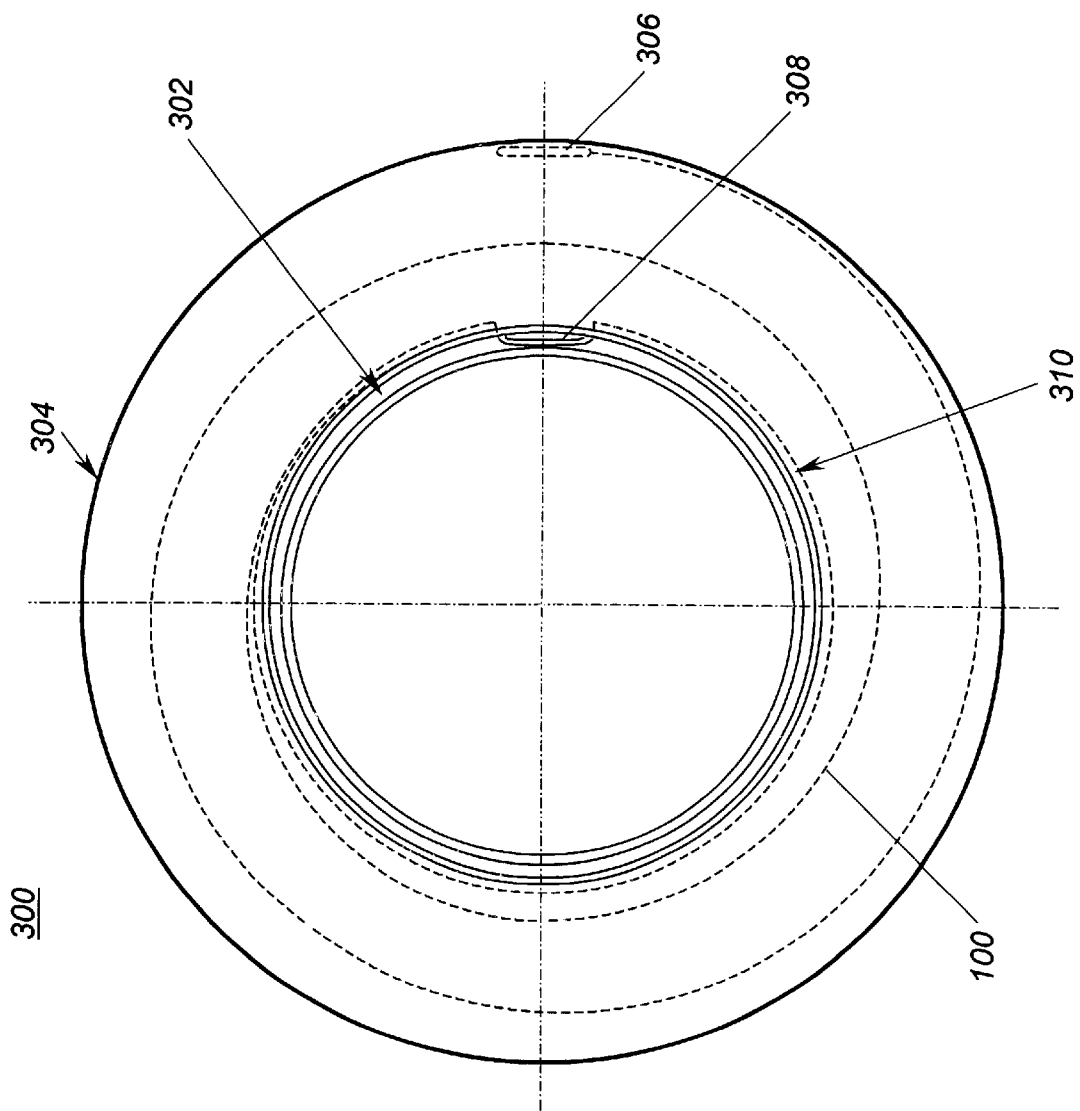
FIG. 3 presents a diagrammatical top view of an electro-optical cablewrap used with a rotating mechanism according to a particular embodiment of the present invention.

As discussed in part above, FIG. 3 presents a diagrammatical top view of an electro-optical cablewrap 300 used with a rotating mechanism 302. The cable 100 is shown entering an outer housing 304 at the cable entry 306. The cable 100 then proceeds in a clock-spring like configuration to the cable exit 308 of the inner hub 310. The illustrated cable 100 connects at the cable exit 308 to a rotating payload 302 (preferably a communications payload) affixed to the inner hub 310 that is preferably gimbaled, e.g., gimbaled about two axes so that the rotating payload 302 is able to rotate about two axes. For example, the rotating payload 302 may be part of a system for optically communicating between satellites in orbit, or an Optical Inter-Satellite Link ("OISL"). Outside the cable entrance 306, the cable 100 preferably connects to various electrical and optical devices.

In a preferred embodiment, the fiber optic elements 102 transmit data and other communication signals at a high speed. Moreover, in a preferred embodiment, the electrical conductors 104 transmit power, command signals, and telemetry signals from payload devices to the rotating devices 302 and motor(s) for driving and pointing the rotating devices. In an exemplary embodiment, the rotating mechanism 302 fits within the inner hub 310 which has a radius of approximately one inch (or a diameter of approximately two inches). In this exemplary embodiment, the distance between the inner hub 310 and outer housing 304 is approximately another two inches. The distance between the two, however, may depend on the length of the cable and how large of an angle the rotating mechanism 302 needs to be rotated through. Preferably, the rotating mechanism 302 may be rotated through at least ±180°.

The fiber optic elements 102 and electrical conductors 104 in the illustrated embodiment are arranged such that the conductors 104 occupy an inner portion of the cable and the fiber optic elements 102 occupy an outer portion of the cable (along the elongated direction of the electro-optical cable 100). While this orientation is not necessary, it is preferred because it allows the cable 100 to have a relatively lower profile than if the fiber optic elements 102 and electrical conductors 104 were "stacked" on top of one another Possible materials for constructing a cablewrap 300 according to the present invention will now be discussed. The electrical conductors 104 are preferably made with oxygen-free copper, but may be made with any suitable conductor. One advantage of using copper is that it has a relatively long flex life, which is important if the cablewrap 300 is repeatedly wound and unwound. If the cablewrap 300 is to be used on board a satellite, the fiber optic elements 102 are preferably made from any fiber resistant to the space environment. As will be appreciated by one skilled in the art, however, the type of fiber optic elements 102 used depends on, for example, the wavelength of light passing through the fiber, whether the fiber is polarization sensitive or not, and whether or not a doped fiber is desired.

The insulating film layers 204, 206, 208, 210, and 212 may be composed of a plastic insulating film and are preferably made from a polyimide polymer. Preferably, the polyimide polymer is KAPTON® (e.g., in a plastic film like form). KAPTON®, manufactured and sold by E. I. du Pont de Nemours and Company, is a polyimide polymer (in a plastic film-like form) made as a result of a polycondensation reaction between pyromellitic dianhydride and diaminodiphenyl ether. A significant benefit of using KAPTON® in the laminate layers is that KAPTON® is very flexible, thus decreasing the power required to rotate the mobile electrical and optical devices. (KAPTON® is also known as Pyralux by DuPont.)

The shielding layers may be made, for example, from a silver epoxy paint. Preferably, the silver epoxy paint is sprayed onto the insulating film layers 204, 206 surrounding the electrical conductors. As will be understood by one skilled in the art, the shielding layers 202 shield electrical emissions from the cable 100 and reduce the susceptibility of the cable to stray electric fields outside the cable 100.

Figure 4:
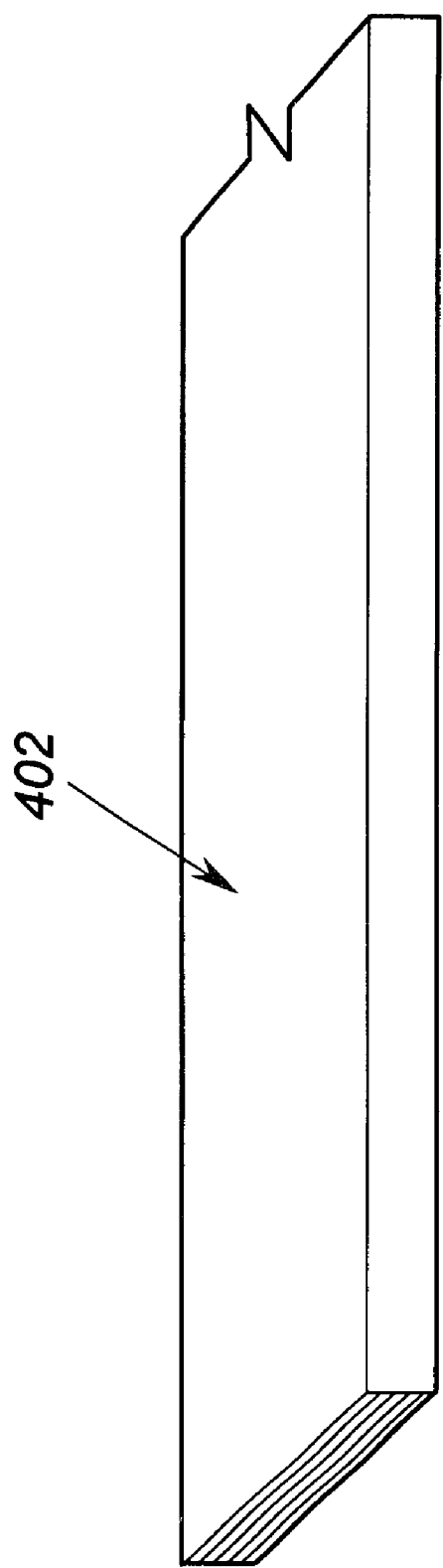
FIG. 4 presents a perspective view of a segment of a jacketed cable according to a particular embodiment of the present invention.

As shown in FIG. 4, a jacket 402 may also be used to cover the cable 100, which A preferably runs substantially the entire length of the cable 100. Such a jacket 402 may be made from a tetrafluoroethylene polymer fiber (e.g., TEFLON® manufactured and sold by E. I. du Pont de Nemours and Company). Such a jacket 402 provides a benefit in that TEFLON® has a slightly smaller coefficient of friction than KAPTON®, so the outer layer could create less resistance when being coiled and uncoiled than if no TEFLON® jacket were provided.

Referring to FIG. 2, in a method of making a cable 100, a sheet of elongated electrical conductors 104 are placed on a first insulating film layer 204. A second insulating film layer 206 is then placed on the electrical conductors 104 on the side opposite the first insulating film layer 204. Both the first 204 and second 206 insulating film layers are then shielded, for example, by spraying a silver epoxy paint on the outside of the first 204 and second 206 insulating film layers. The third and fourth insulating film layers 208, 210 are then placed next to the shielding layers 202. A plurality of fiber optic elements 102 are then laid next to the third insulating film layer 208. In the preferred embodiment, the fiber optic elements 102 are located on the outer portion of the cable 100 while the electrical conductors 104 are located on the inner portion of the cable 100. This helps maintain the low profile feature of the cable 100. A fifth insulating film layer 212 is then placed next to the fiber optic elements 102 so that the fiber optic elements 102 are surrounded by the third 208 and fifth 212 insulating film layers. All of the layers may be adhered or bonded to one another through space flight qualified practice.

Another method of making a cable includes laying the fourth insulating film layer 210. A shielding layer 202 is placed next to the fourth insulating film layer 210. The first laminate layer 204 is placed next to the shield 202. Following this, the electrical conductors 104 are placed next to the first laminate layer 204. The second laminate layer 206 is then placed next to the electrical conductors 104. Another shield 202 is placed next to the second laminate layer 206. The third laminate layer 208 is then placed next to the shield 202. Fiber optic elements 102 are placed next to the third laminate layer 208. The fifth laminate layer 212 is then placed next to the fiber optic elements 102. As discussed above, all of the layers may be adhered or bonded to one another through space flight qualified practice. Both of the methods discussed above include the steps of insulating and shielding a plurality of elongated electrical conductors 104, affixing a sheet of a plurality of fiber optic elements 102 to the insulated electrical conductors, and insulating the plurality of fiber optic elements 102.

Once the construction of the electrical conductors 104, fiber optic elements 102, insulating film layers 204, 206, 208, 210, 212, and shielding is complete, a jacket 402 may be placed around the layers of the cable 100. As discussed above, the jacket 402 is preferably made of a tetrafluoroethylene polymer fiber, for example TEFLON®.

While particular elements, embodiments and applications of the present invention have been shown and described, it is understood that the invention is not limited thereto since modifications may be made by those skilled in the art, particularly in light of the foregoing teaching. For example, although the preferred cable 100 and cablewrap 300 are described for use on board a satellite, the present invention is not limited to such use. It is therefore contemplated by the appended claims to cover such modifications and incorporate those features which come within the spirit and scope of the invention.

What is claimed is:

1. An elongate electro-optical cable comprising:
   a plurality of elongate electrical conductors;
   a plurality of fiber optic elements; and
   an elongate insulating film casing enveloping said plurality of electrical conductors and said plurality of fiber optic elements, said insulating film casing comprising at least one insulating film layer;
   wherein said plurality of electrical conductors, said plurality of fiber optic elements and said elongate insulated film casing are arranged to form a generally flat cable; and
   wherein said at least one insulating film layer is disposed between said plurality of electrical conductors and said plurality of fiber optic elements, said insulating film layer extending substantially along a plane in which the generally flat cable resides.

2. The cable of claim 1 wherein said plurality of electrical conductors is enveloped by a second insulating film casing and said plurality of fiber optic elements is enveloped by a third insulating film casing.

3. The cable of claim 1 wherein said elongated insulating film casing is non-cylindrical in shape.

4. The cable of claim 1 further comprising at least one shield for shielding at least some of said plurality of elongated electrical conductors.

5. The cable of claim 4 wherein said at least one shield comprises a silver epoxy.

6. The cable of claim 1 further comprising an outer jacket.

7. The cable of claim 6 wherein said jacket encloses substantially all of said electrical conductors, said fiber optic elements, and said insulating film casing.

8. The cable of claim 7 wherein said jacket comprises tetrafluoroethylene polymer fiber.

9. The cable of claim 1 wherein said plurality of elongated electrical conductors comprise oxygen free copper conductors.

10. The cable of claim 1 wherein said elongated insulating film casing comprises a polyimide polymer.

11. The cable of claim 10 wherein said polyimide polymer is formed as a result of a polycondensation reaction between pyromellitic dianhydride and diaminodiphenyl ether.

12. An elongated electro-optical cable comprising:
    a first insulating film layer and a second insulating film layer;
    a conductor layer comprising a plurality of elongated electrical conductors, said electrical conductor layer disposed between said first insulating film layer and said second insulating film layer, wherein said first insulating film layer has an outer surface and said second insulating film layer has an outer surface and said outer surfaces face away from said electrical conductor layer;
    a third insulating film layer and a fourth insulating film layer;
    a first shield layer and a second shield layer, said first shield layer disposed between said first insulating film layer outer surface and said third insulating film layer and said second shield layer disposed between said second insulating film layer outer surface and said fourth insulating film layer;
    a fifth insulating film layer; and
    a fiber layer comprising a plurality of elongated fiber optic elements, said fiber optic layer disposed between said fourth insulating film layer and said fifth insulating film layer;
    wherein said electrical conductor layer, said shield layers said fiber optic element layer, and said insulating film layers are arranged to form a generally flat cable.

13. The cable of claim 12 wherein said electrical conductor layer, said shield layers said fiber optic element layer, and said insulating film layers are arranged to have an elongated direction and a cross-sectional direction and to form a generally flat cable in said cross-sectional direction.

14. The cable of claim 12 wherein said plurality of elongated electrical conductors comprise oxygen free copper conductors.

15. The cable of claim 12 wherein at least one of said insulating film layers comprises a polyimide polymer.

16. The cable of claim 15 wherein said polyimide polymer is formed as a result of a polycondensation reaction between pyromellitic dianhydride and diaminodiphenyl ether.

17. The cable of claim 12 wherein at least one of said shielded layers comprises a silver epoxy.

18. The cable of claim 12 further comprising an outer jacket.

19. The cable of claim 18 wherein said jacket encloses substantially all of said electrical conductor layer, said shield layers, said fiber optic element layer, and said insulating film layers.

20. The cable of claim 18 wherein said jacket comprises tetrafluoroethylene polymer fiber.

21. A method for making an elongated electro-optical cable comprising:

insulating and shielding a sheet of a plurality of elongated electrical conductors;

affixing a sheet of a plurality of fiber optic elements to the plurality of insulated, elongated electrical conductors; and insulating the plurality of fiber optic elements.

22. The method of claim 21 wherein said step of insulating and shielding a plurality of shielded electrical conductors comprises:

insulating a plurality of elongated electrical conductors;

shielding the plurality of elongated electrical conductors; and insulating the plurality of shielded elongated electrical conductors.

23. The method of claim 22 wherein said step of insulating the plurality of elongated electrical conductors comprises:

laying a first sheet of insulating film;

laying a plurality of elongated electrical conductors on said first sheet of insulating film; and laying a second sheet of insulating film on said plurality of electrical conductors, opposite said first sheet of insulating film.

24. The method of claim 23 wherein said step of insulating the plurality of fiber optic elements comprises:

laying a third sheet of insulating film on the shield of the first side of the plurality of elongated electrical conductors; and laying the sheet of the plurality of fiber optic elements on the third sheet of insulating film, opposite said shield applied to said first sheet of insulating film; and laying a fourth sheet of insulating film on said plurality of fiber optic elements, opposite said third sheet of insulating film.

25. The method of claim 22 wherein said step of shielding the plurality of elongated electrical conductors comprises:

applying a shield to a first side of the plurality of insulated, elongated electrical conductors; and applying a shield to a second side of the plurality of insulated, elongated electrical conductors.

26. The method of claim 21 further comprising jacketing the sheet of the electrical conductors and the sheet of the plurality of fiber optic elements.

27. An elongate electro-optical cable comprising:

means for transmitting electrical current;

means for transmitting optical data; and a first insulating means for constraining said optical transmitting means and said current transmitting means in a generally flat cable, said insulating means comprising at least one insulating film layer;

wherein said at least one insulating film layer is disposed between said electrical transmitting means and said optical transmitting means, said insulating film layer extending substantially along a plane in which the generally flat cable resides.

28. The cable of claim 27 wherein said electrical transmitting means is enveloped by a second insulating means and said optical transmitting means is enveloped by a third insulating means.

29. The cable of claim 27 wherein said first insulating means is non-cylindrical in shape.

30. The cable of claim 27 further comprising means for shielding said electrical transmitting means, said shielding means contacting said first insulating means.

31. The cable of claim 30 wherein said shielding means comprises a silver epoxy.

32. The cable of claim 27 further comprising a jacketing means enveloping said first insulating means.

33. The cable of claim 32 wherein said jacketing means comprises tetrafluoroethylene polymer fiber.

34. The cable of claim 27 wherein said electrical transmitting means comprises oxygen free copper.

35. The cable of claim 27 wherein said first insulating means comprises a polyimide polymer.

36. The cable of claim 35 wherein said polyimide polymer is formed as a result of a polycondensation reaction between pyromellitic dianhydride and diaminodiphenyl ether.

* * * * *